United States Patent
Ortega et al.

[15] 3,653,513
[45] Apr. 4, 1972

[54] SWIMMING POOL FILTER APPARATUS

[72] Inventors: Robert Ortega; Chester A. Sable, both of Orange County, Calif.

[73] Assignee: Anthony Pools, Inc., South Gate, Calif.

[22] Filed: Nov. 4, 1969

[21] Appl. No.: 873,969

[52] U.S. Cl. .......................... 210/169, 210/333, 210/347, 210/472
[51] Int. Cl. ................................................. B01d 29/34
[58] Field of Search .............. 210/331, 456, 486, 169, 333, 210/347, 345, 436, 472

[56] References Cited

UNITED STATES PATENTS

| | | | |
|---|---|---|---|
| 2,207,346 | 7/1940 | Hopper | 210/486 |
| 2,562,699 | 7/1957 | Cooperson et al. | 210/472 X |
| 3,019,905 | 2/1962 | Baker et al. | 210/347 X |
| 3,069,014 | 12/1962 | Lewis | 210/347 X |
| 3,187,898 | 6/1965 | Baker | 210/333 X |
| 3,187,899 | 6/1965 | Prizler | 210/331 |
| 3,471,022 | 10/1969 | Conrad | 210/456 X |
| 3,512,647 | 5/1970 | Young | 210/169 |

*Primary Examiner*—Frank A. Spear, Jr.
*Attorney*—George J. Netter and Kendrick and Subkow

[57] ABSTRACT

A plurality of generally planar filter elements are arranged in a mutually spaced stack which is mounted within a filtering chamber with the filter elements maintained planarly vertical. The stack mounting means provides resting support within the chamber while hydraulically connecting the stack externally of the chamber. Water to be filtered enters the bottom of the chamber and is spread to move along the chamber bottom and upwardly therein.

A further aspect is the construction of each filter element including a plurality of readily extending channels terminating in a central cavity. A fabric septum covers the entire grid except the cavity. Stacking is accomplished by connecting the grid elements in the region adjacent the central cavity.

2 Claims, 11 Drawing Figures

INVENTORS.
ROBERT ORTEGA
CHESTER A. SABLE
BY KENDRICK and SUBKOW

George J. Netter
ATTORNEY

PATENTED APR 4 1972
3,653,513
SHEET 3 OF 3
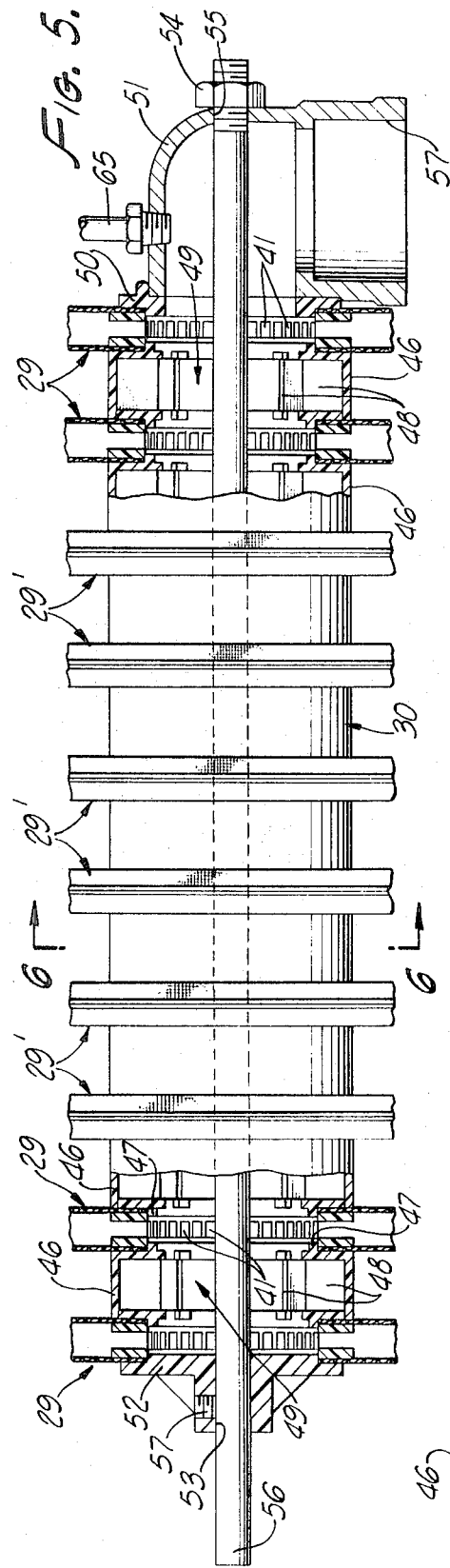
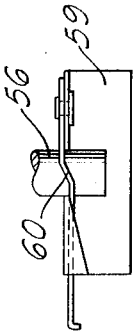
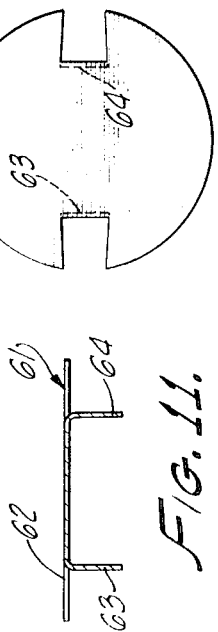
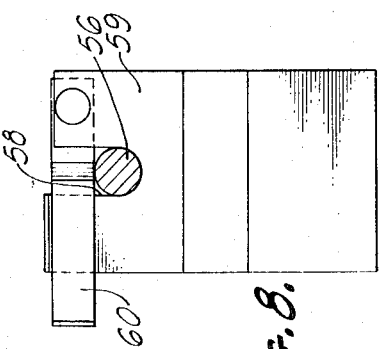
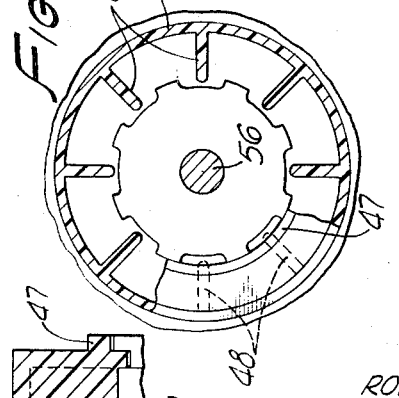
INVENTORS.
ROBERT ORTEGA
CHESTER A. SABLE
BY KENDRICK and SUBKOW
George J. Netter
ATTORNEY

SWIMMING POOL FILTER APPARATUS

BACKGROUND OF THE INVENTION

The present invention relates generally to filter apparatus, and, more particularly to filter apparatus for use with a swimming pool.

One form of widely used filter apparatus for use with swimming pools is constructed of a plurality of individual fabric covered filter elements arranged in an enclosed chamber where pool water to be filtered is directed into the chamber about the filter elements and after having suspended matter removed on passing through the elements is then channeled back into the pool. To prevent clogging, or charging of the filter fabric and aid filtering, it is usual practice to coat the outer fabric surface with a special pulverulent material, such as diatomaceous earth, which is porous to liquids. Typically, the filter coating is applied by adding the powdered material to the water upstream of the filter apparatus and as it enters the apparatus it is deposited or caked onto the filter elements. Valving means are also conventionally provided with this equipment which are actuable to reverse the water flow through the filter, whereby suspended material filtered from the water is removed from the filter elements and passed out to waste. Although the overall approach of this type of filtering apparatus has been found excellent for swimming pool use, actual constructions of known systems of this kind have been subject to a number of defects and have been, therefore, found to be less than completely satisfactory.

Certain known filters have a number of sheetlike filter elements secured in an upstanding integral relationship by a lower manifold and an upper spreader member. The manifold and spreader member, due to the continuous bearing contact with the filter elements, wears holes in the fabric covering, necessitating repair or replacement. Also, on adding diatomaceous earth or other filter powder to the water entering this filter apparatus there is a tendency for a significant amount of the material to settle out on the manifold and spreader member where it, of course, does not aid filtering.

Moreover, certain types of known filters have sheetlike filter elements arranged vertically, providing a spiral aspect when viewed in plan. Backwashing in this case billows the filter fabric or cloth outwardly into contact with adjacent filter fabrics, thereby impeding cleaning of the elements. Also, many of these filter elements are curved about a vertical axis which inherently results in an excessive amount of billowing on the concave portions that is detrimental to element cleaning.

In certain other types of known filtering apparatus an externally located crank is manipulated during backwash to rotate the filter elements to assist the stripping off of foreign matter and caked diatomaceous earth, for example. Not only do such spin filters have moving parts which wear out and must be replaced, but also there is the continuing problem of leakage at the crank journals. Moreover, there is a frequent tendency for the powdered filter aid to collect around the lower filter element parts "freezing" them so that when spinning is attempted either the cranking mechanism or the filter elements themselves are damaged.

OBJECTS AND SUMMARY OF THE INVENTION

It is therefore a primary aim and object of the present invention to provide swimming pool filtering apparatus exhibiting improved filtering and backwashing.

Another object is the provision in filtering apparatus of filtering elements having fabric septa that are subject to a minimal amount of billowing during backwash.

A further object is the provision of filtering apparatus including a plurality of filter elements maintained in a stack without recourse to edge or surface bearing contacting members that can abrade the fabric septa.

Yet another object is the provision of pool filtering apparatus not requiring moving parts or journals.

A further object is the provision of pool filtering apparatus located in an enclosed chamber, the filtering elements of which are supported in a manner so as to provide a minimum of surface on which loose filter aid powder can be deposited.

Yet another object is the provision in filtering apparatus of a baffle or spreader for deflecting incoming pressurized water substantially uniformly about the filter elements.

A further object is the provision of filtering apparatus readily disassembled into component parts for repair or replacement.

In summary, the filtering apparatus of this invention includes a pair of hollow cylindrical halves, each closed at one end, removably fastened together to form a filtering chamber. Water to be filtered is added to the chamber at its lower end, and filtered water is removed via a fitting in the chamber side. A plurality of individual, generally rectangular filter elements are stacked in spaced, planarly vertical relation within the chamber. The central internal parts of the filter elements are linked together into a single conduit which connects with the clean water outlet in the chamber side. An air relief tubing has one end disposed in the uppermost reaches of the chamber and its lower end communicating with the outlet fitting.

Each filter element includes a one-piece, skeletal grid over which a woven septum is stretched. Radially extending wall members of the grid collectively form channels terminating in a common central cavity. In assembly, the filter elements are spaced apart by hollow separators whereby a common conduit is formed by the central filter element cavities and hollow separators. The assembled filter elements are integrally related and mounted via the filter chamber and connected with the outlet fitting in a quick disconnect manner. In this manner the fabric filter element covers are only contacted on their outer surface by gripping in confined areas adjacent their central portions with the outer regions free from restraint.

A three-way valve interrelates the pool, pumping systems and the filter apparatus. In a first connection mode, water from the pool enters at the chamber lower end, passes through the filter elements, leaving suspended materials on the septa outer surfaces, the clarified water then exits to the pool. In backwashing connection, water from the pool is pumped into the interior of the filter elements and outwardly through the septa dislodging foreign matter which is carried to waste via the fitting in the chamber bottom.

A further aspect is the provision of a baffle member adjacent the entrance for pressurized water to the chamber for deflecting it away from direct impingement onto the filter elements and forcing it to follow a path at first horizontal and then upwardly along the inner walls of the filter chamber.

DESCRIPTION OF THE DRAWINGS

FIG. 4 is a sectional, elevational view of the filter grid element of FIG. 3, taken along the line 4—4.

FIG. 5 is a fragmentary, partially sectional, slightly enlarged, elevational view depicting assembly of the filter grid elements to one another.

FIG. 6 is a sectional, elevational view, taken through a filter grid spacer and along line 6—6 of FIG. 5.

FIG. 7 is a fragmentary, sectional view through a portion of the spacer of FIG. 6.

FIG. 8 is an end view of a quick disconnect filter element securing means.

FIG. 9 is a plan view of the securing means of FIG. 8.

FIG. 10 is a plan view of a spreader or baffle plate for use with the apparatus of FIG. 1.

FIG. 11 is a sectional, elevational view of the spreader or baffle plate of FIG. 10.

DESCRIPTION OF A PREFERRED EMBODIMENT

Figures 1, 2:
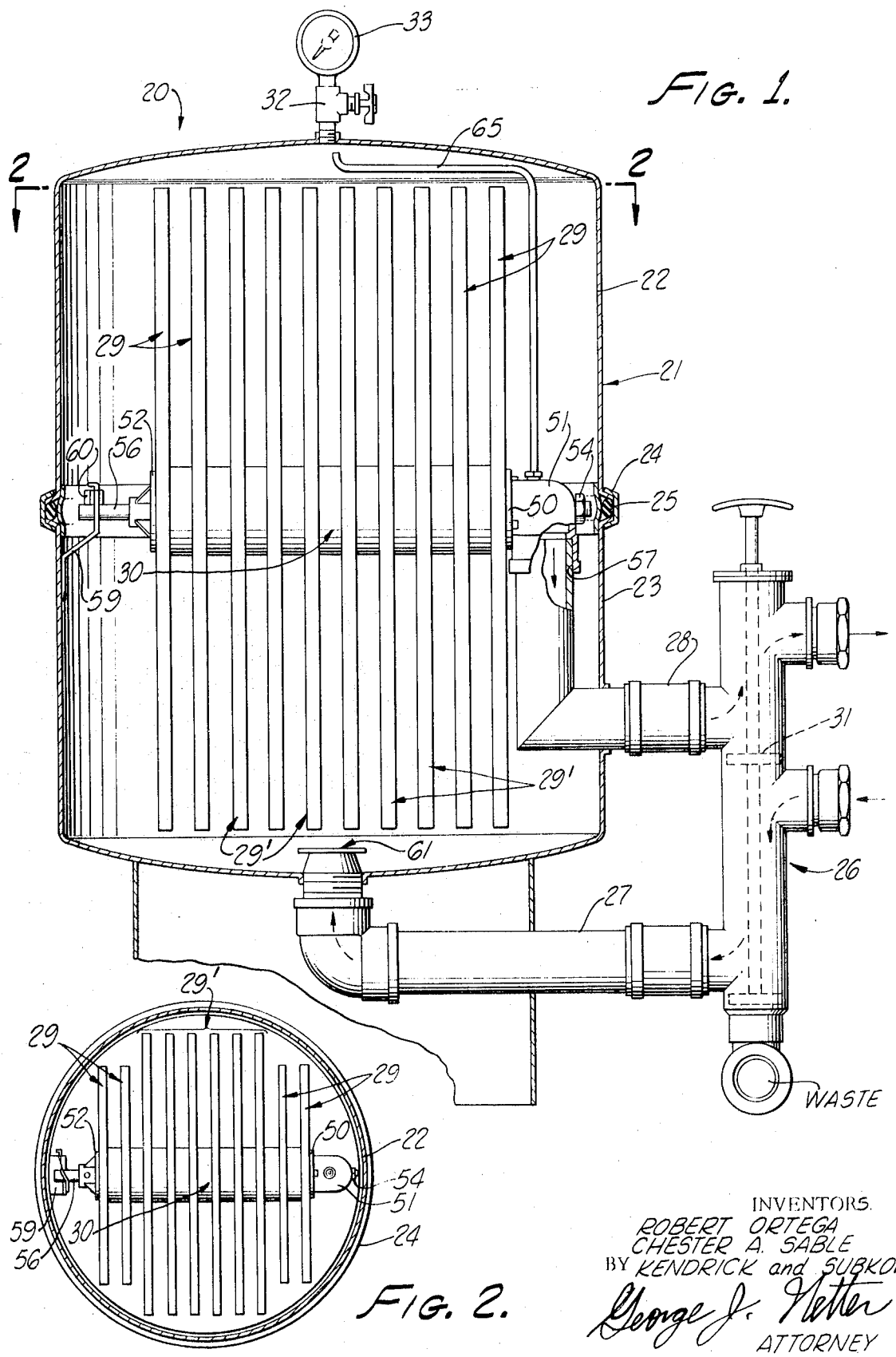
FIG. 1 is an elevational, partially sectional view of the filtering apparatus of this invention.
FIG. 2 is a plan sectional view of the apparatus of FIG. 1, taken along the line 2—2.

On reference to FIGS. 1 and 2, the filtering apparatus of the present invention is identified generally by the reference numeral 20. Filtering is accomplished within a generally hollow cylindrical chamber 21, consisting of upper and lower cylinder halves 22 and 23, respectively, which are joined together by a clamping brace 24 extending completely about the peripheral line of junction. Along the inner surface of the brace 24 there is provided a flexible O-ring seal 25, which is compressed against the flanged cylinder half edges during assembly to prevent leakage.

A conventional three-way valve system 26 has a pair of pipe connections 27 and 28 at the bottom and side of the chamber 21, respectively. In the normal filtering setting for the valve 26 as shown in FIG. 1, incoming water from the pool is pumped through pipe 27 and enters the lower part of the chamber 21. The pressurized water within the chamber is then filtered by the various filter elements 29, after which it passes through a central conduit means 30 and out through the pipe 28 to return to the pool.

Transferring the valving member 31 to its upper or backwash position causes the pressurized water to be pumped through 28, the conduit means 30, out through grid elements 29 to exit via connection 27 to waste.

As newly added water moves into the chamber 21, as, for example, immediately after placing the unit into operation, a pocket of air forms in the uppermost part of upper half 22, which, if not removed, will prevent filling of the chamber and thus the loss of use of extensive filtering surfaces. A relief valve 32, located in the top of cylinder half 22, is left open during initial filling of the chamber, as after making repairs or when the apparatus is first placed into operation, which allows the air to be removed. Also, a conventional pressure meter 33 is provided in the top of the chamber 21 immediately adjacent the relief valve.

As best seen on comparison of FIGS. 1 and 2, the filter elements are of two sizes - element 29, and a larger element 29', which is otherwise identical. Use of two different sized elements 29 and 29' provides efficient utilization of the cylindrical chamber interior.

Figure 3:
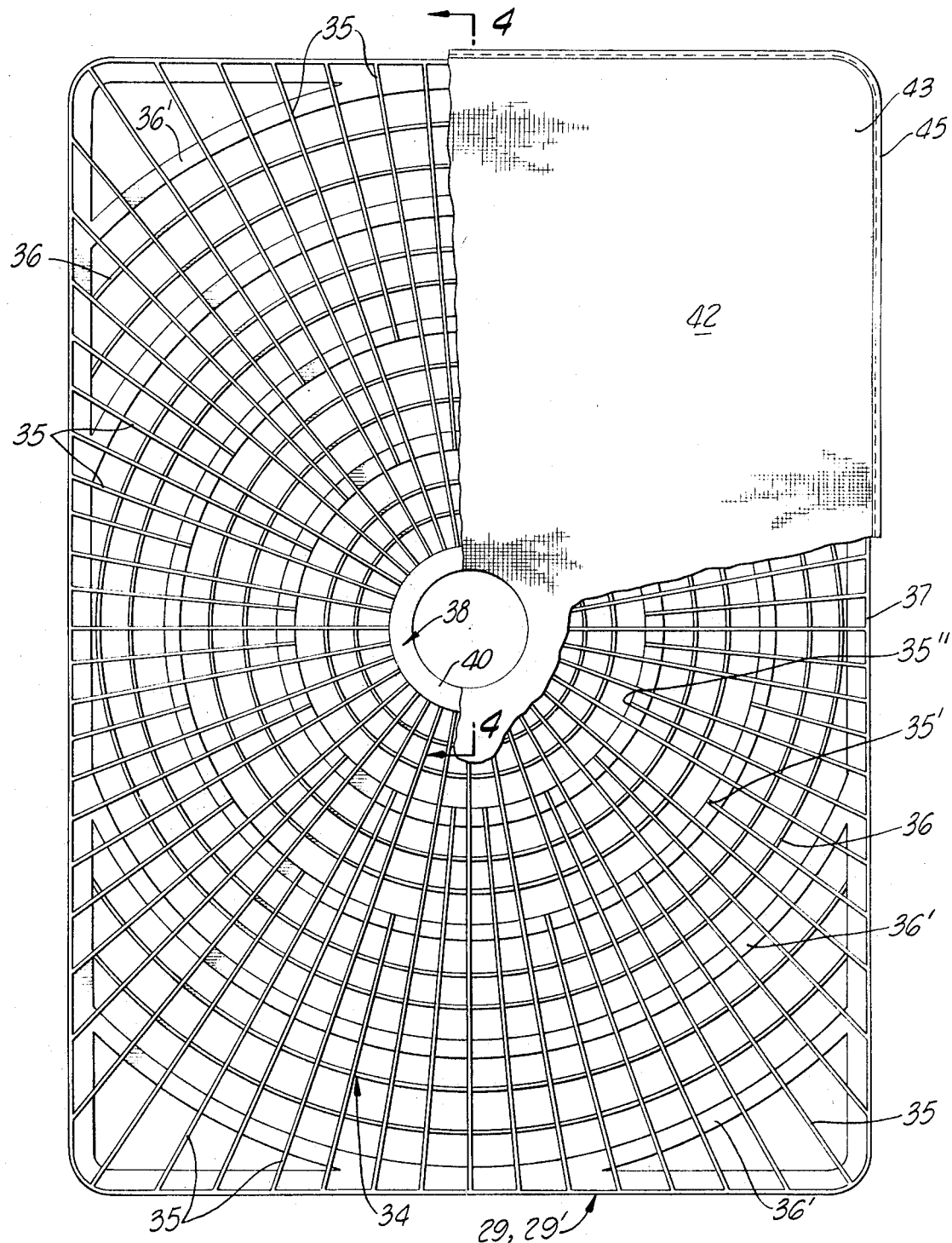
FIG. 3 is an enlarged, elevational, partially fragmentary view of a filter grid element, for use in the apparatus of FIG. 1.

Turning now to FIG. 3, each filter element is seen to include a one-piece skeletal grid 34 consisting of a plurality of radially extending channel walls 35 interconnected by generally circularly curved reinforcing ribs 36. The outer ends of the channel walls terminate in, and are integral with, an outer or boundary wall member 37. The inner end of each channel wall 35 is affixed to an annular header 38.

It is to be particularly noted that as seen in the elevational view of FIG. 3, those channel walls terminating at the annular header are preferably arranged at a uniform spacing. Certain other channel walls 35 extend inwardly from the boundary wall 37 toward the annular stiffener a limited amount as at 35' and 35'', for example. Moreover, whereas certain of the ribs 36 are relatively thin, others, identified as at 36', have a substantially greater width. The inner end of the shorter walls 35', 35'' each terminates in one of the wide ribs 36', thereby providing unitary construction.

As depicted in FIG. 4, the ribs 36 and 36' have a thickness that is substantially less than the width of the channel walls 35. Moreover, between each of the wide ribs 36' there are disposed a pair of ribs 36, one of which is located above the elevational center line for the channel wall 35 shown in FIG. 4 and the other below. The purpose in making the ribs relatively thin in the section is to permit water, as will be more particularly described later, to move from the peripheral regions of the filter element toward the annular cavity of the header 38 with relatively little impedance while at the same time causing the water to course a sinuous path about the ribs 36, 36' for purposes that will be described later herein.

Still referring to FIG. 4, the header 38 consists of a pair of concentric annular members 39 and 40 between which are received the reduced ends of each channel wall 35, thereby forming a plurality of passages or openings 41 which communicate with both the space between adjacent channel walls 35 and the central cavity of the header 38.

A woven septum 42 is stretched over the entire skeletal grid. Specifically, the septum 42 is constructed of two pieces, 43 and 44, which cover opposite sides of the grid and are secured together at the periphery as at 45 by sewing or heat sealing, for example. Although other materials may be found satisfactory, to date best results have been obtained by constructing the septum sheets 43 and 44 of a woven polypropylene fabric.

In assembly, the filtering elements 29, 29' are held together in a spaced relation by a plurality of annular hollow separators 46 depicted in FIGS. 5–7. Each separator includes on its outer major circular faces a continuous hub 47 so dimensioned as to permit fitting receipt within the cavity of an annular header 38 as shown best in FIG. 5. Inwardly of the hub 47 the separator is hollow. A plurality of strengthening ribs 48 serve to unitize and strengthen the separator construction. Accordingly, when each separator is in place between a pair of filter elements, there is provided a common central cavity extending throughout the complete stack and identified generally in FIG. 5 by reference numeral 49. It is to be especially noted that the only bearing contact made with the external septa surfaces are at the inner peripheries thereof by the separator side surfaces, thereby substantially reducing septa abrasive wear prevalent in certain prior art apparatus.

At the outlet end of the stack of filtering elements there is provided a mounting ring 50 having parts that are received within the central cavity of the outermost filtering element and onto which there is received an elbow 51.

The other end of the stack of filtering elements is closed by a face plate 52 having an inner shoulder which is received within the cavity of the header 38 of its outermost filtering element. An opening 53 receives a shaft 56 that passes throughout the complete length of the common cavity or channel 49 and the elbow 51 to extend through a further opening in the elbow wall 55, and is terminated by a threaded nut 54. The face plate 52 is secured onto the stack of filtering elements and to the shaft 56 as by a set screw, for example.

It is clear that the shaft 56 serves to hold the entire assembly of filtering elements to one another so the assembly can be removed and replaced in position within the filtering chamber as a unit. With the shaft 56 in position and the set screw tightened on the face plate 52, the separators, ring 50, and face plate 51, all tightly engage the filtering elements in the region of their respective annular headers.

With reference now to both FIGS. 1 and 5, with the filtering elements completely assembled on the shaft 56 as previously described, the filter unit assembly is then placed into the chamber 21 with the elbow lower open end 57 received onto the upstanding end of the inner portions of the hydraulic line 28. It is to be particularly noted that the inner end 57 of the elbow 51 is not threaded or in any way secured onto the conduit 28, but is merely frictionally retained thereon. The outer end of the shaft 56 is received within a slot 58 of a yoke rest 59, that is secured to the inner surface of the lower cylindrical half 23. A keeper 60 is then pivoted to the retaining position as shown in FIG. 8. Accordingly, the entire assembly of filter elements can be easily removed by merely lifting upwardly out of the lower cylindrical half 23.

The lower conduit 27, leading from the three-way valve 26 to the bottom of the chamber 21, includes at its inner end a baffle or spreader 61, shown in its detailed construction in FIGS. 10 and 11. More particularly, the spreader consists of a one piece circular deflection plate 62 made of relatively thin metal sheet stock, and includes two downwardly extending ears 63 and 64 which are received within the inner confines of the conduit 27. That is, when the spreader or baffle 61 is in position, water entering the chamber to be filtered encounters the lower surface of 62 first and is deflected toward the chamber side walls and upwardly about the filter elements.

During cyclic operation of the filter apparatus, e.g., on 12 hours and off 12 hours, water within the chamber 21 will drain out a certain amount, leaving an air space at the top which, as was discussed earlier, must be replaced with water or filtering efficiency is adversely affected. As shown best in FIG. 1, a tube 65 has one end threadedly received within the elbow 51 and its other end disposed in the uppermost reaches of the chamber 21. As pressurized water begins to enter the chamber via 27, the entrapped air is forced along the tube 65 into the elbow 51, exiting to the pool with the filtered water.

With the filter apparatus of the invention all assembled, powdered filtering aid such as diatomaceous earth is added upstream of the apparatus such that as the water and admixed powder moves into the chamber 21, it is deflected upwardly along the inner side walls of the chamber, then drifting downwardly to settle onto the filter element. In this manner a relatively even distribution of the powder aid is provided on the outer surfaces of the filter elements, thereby insuring against areas of the fabric septa becoming charged with filtered material and thereby unable to filter.

Due to the fact that such filtering apparatus is usually operated cyclically, a certain amount of the diatomaceous earth or other filter aid will be shaken loose and deposited on the bottom of the chamber 21 during down time. In the present invention however, such pulverulent material is immediately dispersed by the incoming pressurized water as it is deflected by the spreader 61, such that it moves upwardly and then settles down onto the filter elements.

It is of particularly advantageous importance that the construction of the present invention presents minimal horizontal surfaces on which the filter aid can be trapped as is the case in certain prior art constructions. Thus the separators 46, and the upper portion of the elbow 51, are the only surface areas upon which such material can rest and they are generally curved upwardly so as to reduce the tendency for collection thereon.

It is clear, on consideration of the detailed construction of the skeletal grid 34 shown in FIG. 3, that no water is able to make its way into the internal cavity 49 until the water in the chamber 21 has reached substantially the half way point. It is important in insuring that in certain low level operations, i.e., low volume pumping capability, substantially all of the major filtering surface area of the elements 29 and 29' be covered with water, rather than just a small portion thereof.

A further advantageous aspect of the present invention is that on backwashing, because of the tortuous path that the water courses as it makes its way from the central cavity 49 along the various channels between channel walls 35, that the septa are subjected to a pulsating action causing them to flutter, thereby enhancing removal of suspended foreign matter and filter aid. Also, since the spacers 46 hold adjacent filter elements apart, the fluttering action during backwash is of insufficient excursion to bring them into contact with one another and the removed foreign matter and filter powder are easily removed and not entrapped as in certain prior art constructions.

What is claimed is:

1. Swimming pool filtering apparatus, comprising:
walls defining a closed chamber;
means located in the chamber bottom wall for admitting pressurized water from the pool to be filtered;
a plurality of filter elements within the chamber, each of said elements being generally planar and including connecting means solely in the central face portions thereof;
hollow separator means contacting the connecting means of adjacent filter elements and holding said elements in a spaced generally parallel relation, said separator means collectively forming a single conduit with said connecting means through the filter elements;
rodlike means received within the single conduit for securing the filter elements and separator means together as a unit;
hydraulic conduit means for conducting filtered water to the pool having an open unthreaded end extending within the chamber;
a hydraulic fitting connected to the single conduit of the filter elements unit and having parts for sliding receipt onto the hydraulic conduit means unthreaded end;
means carried by the chamber inner wall for supporting the unit of filter elements generally planarly vertical, said supporting mans coacting with the hydraulic fitting received on the hydraulic conduit means end to maintain said elements in fixed predetermined relation within the chamber and permitting ready removal of said elements from said chamber as a unit; and
hollow tubing means having one end terminating within the hydraulic fitting and its other end located within the upper reaches of the chamber when the filter element unit is mounted within said chamber.

2. Water filtering apparatus for use with swimming pools or the like, comprising, in combination:
a first hollow shell member having a closed end, and open end and side walls, said member being mounted with its open end up;
a second hollow shell member for fitting receipt over the first shell member open end to form a closed chamber therewith;
inlet means mounted in the first shell member closed end for bringing pressurized water to be filtered into the chamber;
outlet means mounted in a first shell member side wall for conducting filtered water to the pool including an open-ended upwardly extending pipe located closely adjacent said side wall;
a plurality of fabric covered filter elements, each element having an opening passing through the central portion thereof and in communication with the element interior;
hollow separator means contacting adjacent filter elements and holding said elements in spaced generally parallel relation, said separator means with the openings in the filter elements collectively forming a conduit;
a pipe elbow having an unthreaded open end of such dimensions as to permit sliding receipt onto the outlet means pipe end;
rodlike means having one end secured to the pipe elbow and extending through the conduit securing the filter elements and separator means together as a unit; and
yoke means affixed to the inner side wall of the chamber opposite the outlet means, the free end of the rodlike means being disposed in said yoke means at the same time that the pipe elbow open end is received onto the outlet means pipe end thereby providing a readily detachable, fixed orientation mounting of the filter unit within said chamber.

* * * * *